United States Patent
Martucci et al.

[11] Patent Number: 6,039,084
[45] Date of Patent: Mar. 21, 2000

[54] EXPANDED FLUOROPOLYMER TUBULAR STRUCTURE, HOSE ASSEMBLY AND METHOD FOR MAKING SAME

[75] Inventors: Norman S. Martucci; Boney A. Mathew, both of Clarkston, Mich.

[73] Assignee: Teleflex, Inc., Plymouth Meeting, Pa.

[21] Appl. No.: 08/874,612

[22] Filed: Jun. 13, 1997

[51] Int. Cl.⁷ .............. F16L 11/04; F16L 1/08; F16L 11/20
[52] U.S. Cl. ............ 138/137; 138/131; 138/134
[58] Field of Search ................ 138/137, 127, 138/118, 121, 131

[56] References Cited

U.S. PATENT DOCUMENTS

| | | | |
|---|---|---|---|
| Re. 35,527 | 6/1997 | Martucci | 174/138 |
| 5,124,878 | 6/1992 | Martucci | 361/138 |
| 5,142,782 | 9/1992 | Martucci | 29/138 |
| 5,192,476 | 3/1993 | Green | 264/29 |
| 5,566,720 | 10/1996 | Cheney et al. | 138/137 |
| 5,601,893 | 2/1997 | Strassel et al. | 138/137 |
| 5,613,524 | 3/1997 | Martucci | 138/125 |
| 5,655,572 | 8/1997 | Marena | 137/137 |
| 5,706,865 | 1/1998 | Douchet | 138/137 |
| 5,743,304 | 4/1998 | Mitchell et al. | 138/137 |
| B1 5,124,878 | 4/1996 | Martucci | 361/138 |

*Primary Examiner*—Andres Kashnikow
*Assistant Examiner*—David Hwu
*Attorney, Agent, or Firm*—Kohn & Associates

[57] ABSTRACT

A tubular structure (10) including an expanded fluoropolymer material having an outer surface (12), an inner surface (14), and a wall (16) therebetween. The wall (16) defines a channel (18). A hose assembly (100) includes a tubular inner liner (110) formed of the expanded fluorocarbon polymeric material having an outer surface (112), an inner surface (114), and a wall (116) therebetween defining a channel (118). The hose assembly (110) further includes at least one outer liner (121) disposed about the outer surface (112) of the tubular inner liner (110). A method of making a tubular structure (10) formed of the expanded fluoropolymer material includes the steps of extruding a fluoropolymer tubular structure (10) having an outer surface (12), an inner surface (14), and a wall (16) therebetween defining a channel (18) on an extruder having at least one barrel, at least one screw, at least one mandrel, and at least one die. The method further includes the steps of applying a vacuum to the outer surface (12) to prevent the tubular structure (10) from collapsing and polymerizing the tubular structure (10). A method for constructing a hose assembly (100) includes the steps of extruding a fluoropolymer tubular inner liner (110) and disposing at least one outer liner (121) about the tubular inner liner (110).

23 Claims, 2 Drawing Sheets

EXPANDED FLUOROPOLYMER TUBULAR STRUCTURE, HOSE ASSEMBLY AND METHOD FOR MAKING SAME

TECHNICAL FIELD

The subject invention relates to extruded tube and hose construction. More specifically, the subject invention relates to a tube, hose assembly, a method for making same having an expanded fluorocarbon polymer tubular structure therein.

BACKGROUND OF THE INVENTION

Hose assemblies for conveying fuel and other corrosive materials are well known in the art. Such assemblies are exposed to a variety of fuel mixtures, fuel additives, and caustic materials in addition to being exposed to extreme temperatures and environments. Thus, such hose assemblies must be resistant to chemical, environmental, and physical degradation resulting from chemical exposure, environmental exposure to heat, and physical degradation resulting from bending and repeated movement or forces applied to the hose.

Polymeric fluorocarbon materials, such as polytetrafluorethylene, possess the requisite chemical and temperature resistant properties for most fuel hose applications. Unfortunately, in addition to being expensive, polymeric fluorocarbon materials exhibit relatively poor tensile and hoops strengths. As a result, fluorocarbon materials are prone to kinking. Also, because of inherent memory by the materials, such kinking remains permanent and provides both continual resistance to fluid flow through the hose assembly and also weakens the integrity of the hose assembly. Moreover, as a result of the low tensile strength, the attachment or fixation of coupling members to hose assemblies is difficult.

Various approaches have been described for imparting additional strength to a polymeric fluorocarbon liner. One such approach involves braiding fibers about the inner fluorocarbon liner. The braided fibers provide additional strength to the fluorocarbon liner which results in a hose assembly that resists kinking. Examples of such approaches are disclosed in U.S. Pat. Nos. 5,124,878 issued Jun. 23, 1992, 5,142,782, issued Sep. 1, 1992, and 5,192,476 issued Mar. 9, 1993, all assigned to the assignee of the present invention.

The hose assembly described in the '878 patent includes an extruded and seamless smooth bore inner polymeric fluorocarbon liner, a braided reinforcing layer disposed about the exterior of the inner liner and includes an organic polymeric material dispersed in the reinforcing layer which connects the reinforcing layer to the inner liner thereby providing a hose assembly which is extremely strong and kink resistant.

U.S. Pat. No. 5,170,011, issued Dec. 8, 1992, and reissued as U.S. Pat. No. RE35,527, issued Jun. 10, 1997, and assigned to the assignee of the present invention, discloses a hose assembly including an extruded polymeric fluorocarbon inner liner and a polyamide outer liner disposed about the inner liner which can either be expanded or unexpanded. The advantage of this hose assembly is that when an expanded polyamide material is utilized for the outer liner, a substantial reduction in both the weight and the cost of the hose assembly is achieved while maintaining the necessary strength of the hose. Additionally, when an expanded polyamide liner is utilized, the expanded polyamide outer liner provides protection from external heat and chemical degradation at a substantially reduced weight.

U.S. Pat. No. 5,613,524, issued Mar. 25, 1997, discloses a lightweight hose assembly including an extruded polymeric fluorocarbon inner liner and an outer foamed layer of polymeric fluorocarbon material. The hose assembly can also include a reinforcing layer disposed either about the inner liner or about the outer layer. The hose assembly is lightweight, strong, and kink resistant. The use of a foamed fluorocarbon disposed over the smooth bore extruded inner liner minimizes the use of the expensive fluorocarbon material by imparting close cell voids within the fluorocarbon material thus requiring less material to form the outer layer. As is well known in the art, polymeric fluorocarbon materials are extremely expensive and the use of the expanded fluorocarbon outer layer represented an advance in reducing the cost of the hose assembly. Additionally, the use of the expanded or foamed fluorocarbon outer layer provides an excellent substrate for the attachment of end fittings to the hose assembly by various means including crimping or screw clamping.

As was immediately pointed out above, expanded fluorocarbon polymeric materials have been utilized in the construction and design of hose assemblies. However, expanded or foamed fluorocarbon layers have only been disposed about a smooth bore extruded fluorocarbon inner liner. Until now, the extrusion of an expanded or foamed fluorocarbon tube itself has not been done. The primary reason for the lack of a tube or hose assembly including an expanded fluorocarbon inner liner has been the inability to extrude an expanded fluorocarbon inner liner as it was thought that the expanded fluorocarbon material could not stand up to the then current methods for extrusion of an expanded material.

In general, expanded fluorocarbon products, such as fluorocarbon insulated wire and hoses having an expanded fluorocarbon layer disposed over a solid unexpanded fluorocarbon layer, were some of the only products known to utilize an expanded fluorocarbon material. However, these expanded fluorocarbon layers could only be extruded over a solid substrate such as a wire or an extruder, non-expanded inner liner.

As pointed out above, the use of smooth bore extruded, non-expanded fluorocarbon inner liners is expensive due to the amount of fluorocarbon material necessary to extrude an inner fluorocarbon liner having a wall thick enough to carry the pressures of the fluid flowing therein, capable of being attached to an end fitting without kinking or failure, and allowing for the use of various methods of attaching end fittings to the hose assembly. Therefore, it would be desirable to have an expanded polymeric fluorocarbon tube and/or hose assembly which allows for the utilization of less of the expensive fluorocarbon polymer material, is flexible, kink resistant, less expensive, and which eliminates the disadvantages of the hose assemblies described above. Furthermore, it would be desirable to have a method for extruding an expanded fluorocarbon tube and also utilizing the tube in a hose assembly having, an expanded polymeric fluorocarbon material as its fluid carrying member. Additionally, it would be desirable to have an expanded polymeric fluorocarbon tube in which, because the material is expanded, a heavier wall thickness is possible without increasing the cost of producing the tube or hose assembly which allows for the more positive attachment of end fittings and also for a variety of methods for attaching end fittings to be utilized. This positive attachment can reduce the problem known as creep. Additionally, since the tube or hose assembly is constructed of a closed cell material, it possesses good insulative properties and can be used to carry fluid and/or provide insulation from extreme temperatures, such as being used as a heat shield.

Additionally, by utilizing a melt extrudable fluoropolymer, the expanded tube or hose assembly is heat foamable and can be bent into any desired shape or configuration.

SUMMARY OF THE INVENTION

In accordance with the present invention, there is provided a tubular structure consisting of an expanded fluoropolymer material having outer surface, an inner surface, and a wall therebetween defining a channel.

Additionally, according to the present invention, there is provided a hose assembly comprising a tubular inner liner formed of an expanded fluorocarbon polymeric material having an outer surface, an inner surface, a wall therebetween defining a channel, and at least one outer liner disposed about the outer surface of the tubular inner liner.

Additionally, according to the present invention, there is provided a method of making a tubular structure formed of an expanded fluoropolymer material including the steps extruding a tubular structure comprising a fluoropolymer material having an outer surface, an inner surface, and a wall therebetween defining a channel on an extruder having at least one barrel, at least one screw, at least one mandrel, and at least one die. The method further includes the steps of applying a vacuum to the outer surface of the tubular structure to prevent the tubular structure from collapsing and polymerizing the tubular structure.

Additionally, according to the present invention, there is provided a method for constructing a hose assembly including the steps of extruding a tubular inner liner comprised of a fluoropolymer material having an outer surface and an inner surface defining a channel on a extruder having at least one barrel, at least one screw, at least one mandrel, and at least one die. The method further includes the steps of applying a vacuum to the outer surface of the tubular inner liner to prevent the tubular inner liner from collapsing, polymerizing the tubular inner liner, and disposing at least one outer liner about the tubular inner liner.

Additionally, according to the present invention, there is provided a method of forming fluoropolymer tube by extruding a tube formed of a fluoropolymer material having an outer surface, an inner surface, and a wall therebetween while simultaneously foaming the wall.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
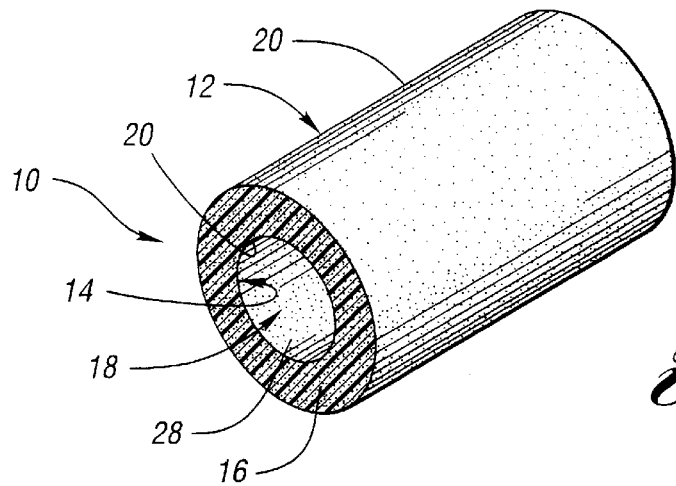
FIG. 1 is a perspective view of a preferred embodiment of the subject invention.

A tubular structure made in accordance with the present invention is generally shown at 10 in FIG. 1. The tubular structure 10 includes an outer surface 12, an inner surface 14, and a wall 16 therebetween. The wall 16 defines a channel 18. The channel is a passageway for conducting a fluid therethrough between the ends of the tubular structure.

The tubular structure 10 is constructed of an expanded polymeric fluorocarbon material resistant to both chemical and heat degradation, thus allowing a variety of fluids, particularly automotive fuels and fuel additives, e.g., detergents, alcohols, etc., to pass through the tubular structure 10 without corroding or degrading the tubular structure 10. The tubular structure 10 is preferably extruded using well-known melt extrusion techniques. Although the tubular structure 10 may be made of any number of polymeric fluorocarbon materials, the tubular structure 10 is ideally made from a polymer of the following: perfluorinated ethylene-propropylene (FEP), a co-polymer of tetrafluoroethylene and hexofluoropropylene sold under the trademark TEFLON®FEP by DuPont, perfluoralkoxy fluorocarbon resin (PFA), a co-polymer of tetrafluoroethylene-perfluorovinyl ether sold under the trademark TEFLON®PFA by DuPont, polymers of ethylene and tetrafluoroethylene sold under the trademark TEFZEL® by DuPont, and any other suitable melt extrudable fluorocarbon materials such as PVDF, THV (Dyneon, Corp.), and PCTFE, however, this list is not intended to be an exhaustive of the fluoropolymers which can be used in the subject tube or hose assemblies.

The expanded fluorocarbon material preferably includes a plurality of closed cells. The cells are disposed within the wall 16. In general, the closed cells comprise approximately 5–85% of the volume of the wall 16 of the tubular structure 10. Preferably, the closed cells comprise approximately 20–50% of the volume of the wall 16 of the tubular structure 10. The closed cells can contain either air, nitrogen, or an inert gas. The closed cell structure provides a substantially impermeable barrier to the fluid and vapors generated therefrom that are carried by the tubular structure 10 by intermixing carbon black throughout the fluorocarbon material prior to extrusion of the tubular structure 10.

The margins of the tubular structure 10 are defined by the outer surface 12 and the inner surface 14. At either or both of the outer 12 or inner 14 surfaces, a skin 20 can be disposed. The skin 20 is a relatively smooth surface, substantially free of any closed cells. That is, the skin 20 can be a substantially smooth surface which is substantially fluid impervious.

The tubular structure 10 can be formed having any desired tubular cross-section but, preferably, is extruded having a substantially circular cross-section.

An integral conductor 28 coextensive of the length of the tubular structure 10 is shown in FIG. 1. The conductor 28 can include a coextruded strip of conductive material, such as carbon black, as shown in FIG. 1. Alternatively, the integral conductor 28 can include carbon black interspersed throughout the tubular structure 10.

Figure 2:
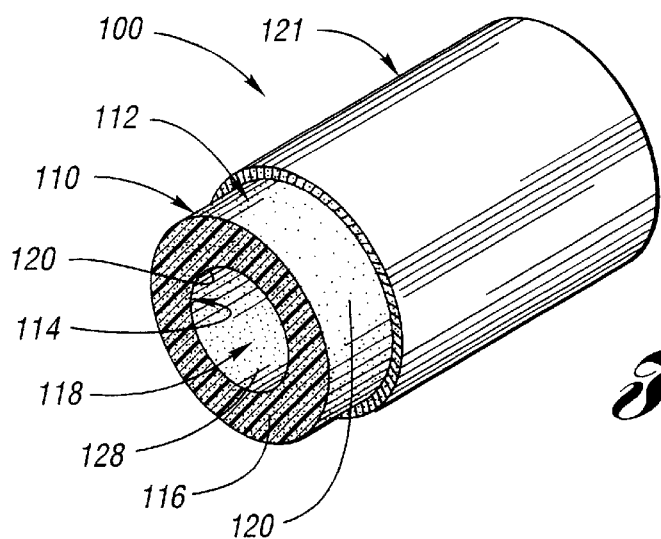
FIG. 2 is a perspective view of a preferred embodiment of the hose assembly of the subject invention.
Figure 3:
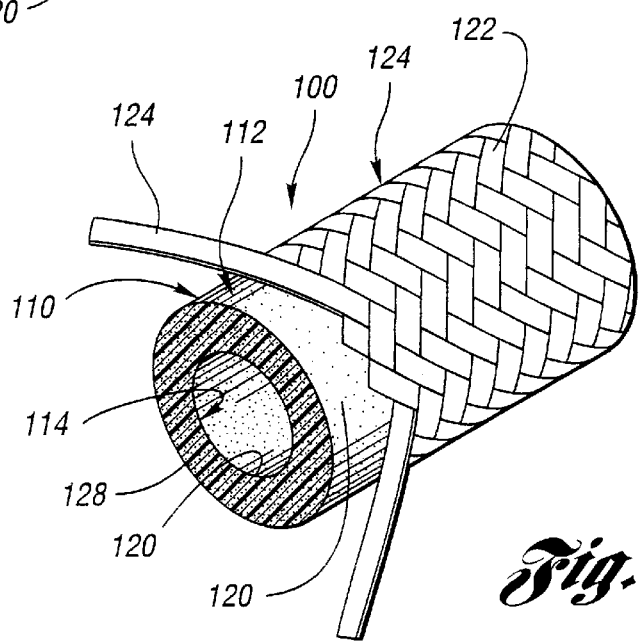
FIG. 3 is a perspective view of a preferred embodiment of the hose assembly of the subject invention.
Figure 4:
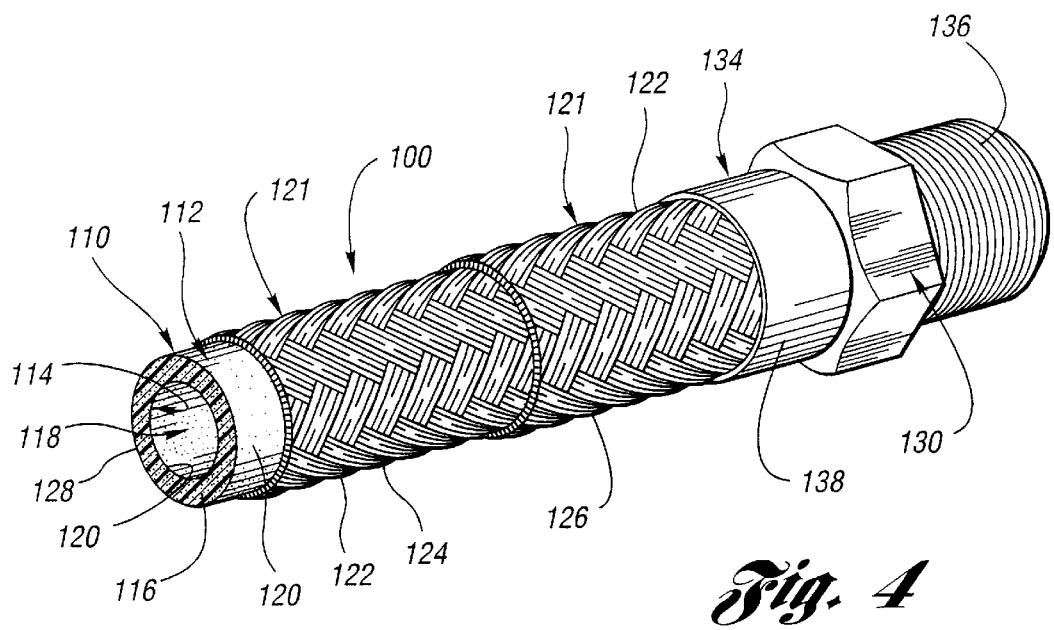
FIG. 4 is a perspective view partially broken away and in cross-section of an alternative embodiment of the subject invention.

Referring to FIGS. 2, 3, and 4, a hose assembly incorporates the above described tubular structure therein and made in accordance with the present invention is generally shown at 100. The assembly 100 includes a tubular inner liner 110 having an outer surface 112, an inner surface 114, and a wall 116 118. The assembly 100 further includes at least one outer liner 121 disposed about the outer surface 112 of the tubular inner liner 110. Utilizing an outer liner 121 allows the hose assembly to have greater strength and hence, greater internal work pressures can be handled without failure of the hose assembly 100.

The tubular inner liner 110, as best shown in FIG. 2, comprises an expanded polymeric fluorocarbon material resistant to both chemical and heat degradation, thus allowing a variety of fluids, particularly automotive fuels and fuel additives, e.g., detergents, alcohols, etc., to pass through the inner liner 110 without corroding or degrading the inner liner 110. The inner liner 110 is preferably extruded using melt extrusion techniques. Although the inner liner 110 may be made of any number of polymeric fluorocarbon materials as described above, the inner liner 110 is preferably constructed from a melt extrudable polymer such as those listed above.

Figure 5:
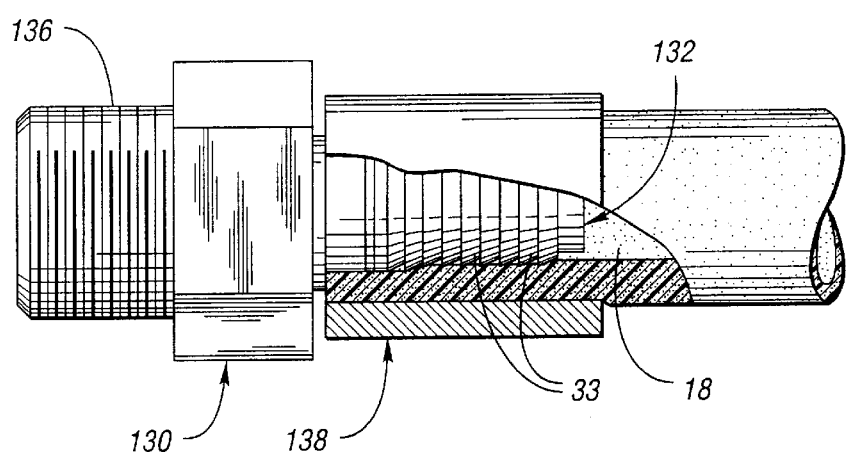
FIG. 5 is a side view partially broken away of a preferred embodiment of the subject invention including a coupling member.
Figure 6:
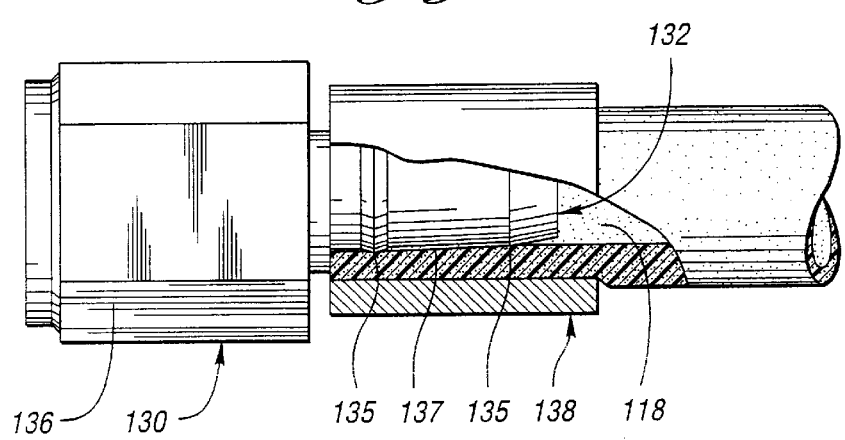
FIG. 6 is a side view partially broken away of a preferred embodiment of the subject invention including an alternative coupling member.

The outer liner 121, best shown in FIGS. 2 and 3, is disposed about the inner liner 110. The outer liner 121 generally comprises a material which increases the strength and kink resistance of the hose assembly 100. The outer liner 121 allows the inner liner 110 to be bent without kinking. That is, the outer liner 121 provides strength to the inner liner 110 upon bending. This is commercially referred to as hoop strength. Thus, by disposing the outer liner 121 about the inner liner 110, the hoop strength of the inner liner 110 is increased. Further, the outer liner 121 increase the working pressure which the hose assembly 110 is capable of handling without bursting. That is, the outer liner 121 provides strength to the inner liner 110 and allows the inner liner 110 to accommodate a fluid under pressure. Additionally, the outer liner 121 adds to the tensile strength of the hose assembly 110. When coupling members 130, as shown in FIG. 4, 5, and 6, are disposed on the ends of the hose assembly 100, as described below, the outer liner 121 increases the tensile strength of the hose assembly 100 sufficiently to fixedly connect the coupling member 130 to the hose assembly 100. The outer liner 121 can provide a surface for attachment of a coupling 130 which allows for a more positive affixing of a coupling or end fitting 130 to the hose assembly 100 without causing damage to the tubular inner liner 110 and also preventing creep of the end fitting 130 and hose assembly 100.

The outer liner 121, as shown in FIG. 2, can include a layer of polymeric material disposed about the inner liner 110. The polymeric material preferably is comprised of a thermoplastic material. The thermoplastic material can include polyamides, fluoropolymers, polyvinyls, polyesters, polyurethanes, aliphatic polyketones, PPS, or combinations thereof.

When a polyamide is used for the outer liner 121, it can be made of any number of polyamide materials. Preferably, the outer liner 121 is made from a polyamide material selected from the following: polyamide 6; polyamide 6,6; polyamide 11; polyamide 12, or mixtures thereof. The selection of a particular polyamide material should be based upon the physical requirements of the particular hose assembly application. For example, polyamide 6 and polyamide 6,6 offer higher heat resistant properties than polyamide 11 or polyamide 12, whereas polyamide 11 and polyamide 12 offer better chemical resistant properties than polyamide 6 or polyamide 6,6. The ultimate selection of a polyamide material should be based upon requirements of a particular hose assembly application. In addition to those polyamide materials previously mentioned, other polyamide materials such as: polyamide 6,12; polyamide 6,9; polyamide 4; polyamide 4,2; polyamide 4,6; polyamide 7; and polyamide 8 may also be used. Ring containing polyamides including aliphatic-aromatic polyamides, e.g., nylon 6T and nylon 6I may also be used. Aramid materials can also be used including the most well known aramid, KEVLAR®, manufactured by DuPont. Finally, the outer liner 121 may also comprise various polyamide blends. Again, it should be noted that the selection of a particular polyamide material is dependent upon the specific physical requirements of a particular hose assembly application.

A polyamide outer liner 121 disposed about the inner liner 110 can be comprised of either unexpanded polyamide material, as shown in FIG. 2 or alternatively, the outer liner 121 can comprised an expanded polyamide material (not shown). Although expanded and unexpanded polyamide outer liners 121 both offer the hose assembly 100 increased hoop and tensile strength, the expanded polyamide material is preferred. The expanded polyamide material imparts to the hose assembly 100 substantially the same degree of strength as the unexpanded material while significantly reducing the weight and cost of the hose assembly 100. The expanded polyamide material is significantly lighter in weight than the unexpanded polyamide material due to the presence of void spaces therein formed during the expansion process.

The expansion process, commonly known in the art as "foaming", generally takes place while extruding the outer liner 121. Such foaming processes generally require physical blowing agents, chemical blowing agents, or mixtures of both. The blowing agent is generally intermixed with the polyamide material prior to the extrusion of the outer liner 121 and causes expansion of the polyamide by producing gas, thereby forming void spaces within the outer liner 121.

Due to the chemical inertness and general lubricious nature of polymeric fluorocarbon materials, relative movement between the inner liner 110 and the outer liner 121 is often encountered. In hose applications which require immobility among adjacent layers, the present hose assembly 100 can be modified to eliminate such relative movement between the inner liner 110 and the outer liner 121.

One embodiment for eliminating relative movement the inner liner 110 and a polyamide outer liner 121 involves etching the outer surface 112 of the inner liner 110 prior to disposing the outer liner 121 thereabout. Etching techniques are well-known in the art. Examples of common etching techniques include acid treatment, plasma or corona discharge treatment and mechanical scuffing. Subsequent to etching, the outer surface 112 of the inner liner 110 possesses an irregular configuration. Essentially, the irregular configuration comprises a rough surface having a plurality of microcavities and protuberances therein.

Subsequent to etching the outer surface 112 of the inner liner 110, the outer liner 121 is extruded thereover. During this extrusion, the outer layer is brought into mating engagement with the inner liner 110 thereby resulting in a mechanical bond a chemical bond or both therebetween. This bond prohibits relative movement (rotational or longitudinal) between the inner liner 110 and outer layer 121.

Alternatively, as shown in FIGS. 3 and 4, the outer liner 121 can include a reinforcing layer 122 having gaps extending therethrough. Generally, the reinforcing layer 122 includes an inner and an outer periphery. The inner liner 110 extends from the inner periphery of the reinforcing layer 122 radially outwardly toward the outer periphery of the reinforcing layer 122. The alternative embodiment includes disposing at least one braided/woven, knitted, and/or layed layer 124 about the tubular inner liner 110. More specifically, the alternative embodiment includes a braided/woven layer 124 disposed in an interleaving fashion, or wrapped tightly about the outer surface 112 of the tubular inner liner 110. Preferably, the material used for the braided layer 124 is a glass fiber. Glass fibers are preferred due to their relatively low cost, superior heat resistant properties, and compatibility with fluoropolymer materials. Additionally, another fiber material can be braided either alone or interwoven with the glass fibers. Such a material would include KEVLAR® an aramid sold by DuPont.

The braided/woven fibers can be tightly wound or can be loosely wound about the tubular inner liner 112 having wide gaps between adjacent fibers. The assembly 100 can further include an intermediate coating dispersed in the braided layer 124. The intermediate coating preferably comprises a fluorocarbon polymer in a liquid form or in a dispersion. The intermediate coating as applied, can comprise a fluorocarbon polymer and at least one dispersing agent. Preferably the dispersing agent is water. It will be appreciated that any suitable dispersing agent can be used. The preferred fluorocarbon polymer material is a melt extrudable fluorocarbon polymer as described above. The intermediate coating coats or is dispersed throughout the braided layer 124. Subsequent to coating, the dispersion agent is removed from the intermediate coating by drying. This leaves the intermediate coating essentially comprising only the fluorocarbon material dispersed throughout the braided layer 124 and secured or bonded to the outer surface 112 of the inner liner 110.

The fibers are preferably woven at a neutral braid angle. The neutral angle is preferred since there is no movement of the hose under internal pressure in either the longitudinal (length) or across the diameter. It is preferred that the braid angle is as close to the neutral angle as possible. However, variation in materials, selection of reinforcing fiber material, and the machines used to apply the braid impart some variation.

Additionally, if the polymeric material selected for the outer liner 121 is a fluoropolymer material, the outer layer 121 can be cohesively attached or bonded to the inner liner 110 utilizing a covalent or hydrogen chemical bond therebetween. This chemical bond prohibits relative movement (rotational or longitudinal) between the inner liner 110 and outer liner 121.

Alternatively, the outer liner 121 can be made from a metallic material 126, preferably stainless steel. This metallic braided/woven, knitted, or lay layer 126 can be applied either directly over the tubular inner liner 110 or can be disposed about a non-metallic braided material 124 as is best shown in FIG. 4. The metallic layer 126 includes a metallic material which increases the strength and flexibility of the hose assembly 100. More specifically, the metallic outer layer 126 allows the inner liner 110 to be bent to smaller radii without kinking. That is, the outer metallic layer 126 provides strength to the inner liner 110 upon bending. Also, by disposing the outer metallic layer 126 about the reinforcing layer 124 and/or the inner liner 110, the hoop strength of the inner liner 110 can be increased, thus improving the strength of the entire hose assembly 100.

Improvement in the bend radius allows the hose assembly 100 to be manipulated or place into configurations which would normally impinge or kink the inner liners of prior art hose assemblies. In other words, the metallic outer layer 126 allows for a reduction in static bend radius of the hose assembly 100 thereby allowing the hose assembly 100 to be utilized in a greater number of applications.

Additionally, the metallic outer layer 126 adds to the burst strength of the hose assembly 100. The metallic outer layer 126 allows the hose assembly 100 to be used in applications where the hose assembly 100 is operated at much higher operating pressures without bursting of the hose assembly 100. Furthermore, the metallic outer layer 126 provides for more positive affixation of couplings or end fittings 130 as shown in FIG. 4. The metallic outer layer 126 increases the tensile strength so that the hose assembly 100 can be fixedly connected to the coupling 130.

The metallic layer 126 can be made from any suitable metal material. In the preferred embodiment of the hose assembly 100, the outer layer 126 is made from stainless steel. The metallic outer layer 126 is preferably braided in place over either the tubular inner liner 110 or over the non-metallic braided reinforcing layer 124. The metallic braided outer layer 126 is preferably applied about the exterior of either the inner liner 110 or the braided layer 124 by utilizing a braiding machine which is well known in the art. The machine includes a plurality of spools which carry appropriately sized stainless steel wire material. The stainless steel wire is fed through the machine to a braiding area. In the braiding area, the wires are braided or wound about the exterior of either the inner liner 110 or the non-metallic braided reinforcing layer 124.

Alternatively, the metallic braided layer 126 may also constructed in its entirety in a sock-like fashion and then applied about the exterior of the non-metallic braided reinforcing layer 124. Unlike the non-metallic braided reinforcing layer 124, the metallic braided outer layer 126 is not bonded to any of the underlining structure. That is, the braided metallic outer layer 126 is not affixed to the underlying hose assembly. The braided layer 126 can be applied utilizing a braiding machine which is commonly known as a maypole braider or may be applied using a rotary braider which is commonly known in the art As fluid flows through the inner liner 110, electrical charges tend to built up throughout the length of the inner liner 110. In order to prevent these electrical charges from accumulating, the inner liner 110 can include an integral longitudinal conductor 128 co-extensive with the length of the inner liner 110 for conducting an electrical charge along the length of the inner liner 110. The integral conductor 128 can include a conductive strip of carbon black, as shown in FIGS. 2, 3, and 4. Preferably, the integral conductor may be interspersed throughout the inner liner 110 by intermixing carbon black throughout the polymeric fluorocarbon material prior to the extrusion of the inner liner 110.

The hose assembly 100 can further include a coupling or end fitting 130. The coupling or end fitting 130 is for connecting the assembly 100 to a fluid source (not shown). Referring to FIGS. 5 and 6, the coupling or end fitting 130 can include a male end or insert portion 132 for inserting into and engaging the inner surface 114 of the inner liner 110. The insert portion 132 can include a plurality of barbs 133 for engaging the interior surface 114. Alternatively, referring to FIG. 6, the insert portion 132 can include a pair of annular ridges 135 and smooth portion 137 therebetween.

The coupling or end fitting 130 can further include an engaging portion 136 extending longitudinally from the insert portion 132. The engaging portion 136 is for engaging a fitting adapted to cooperate therewith. The engaging portion 136 may comprise a male threaded member (as shown in FIGS. 4 and 5) or an internally threaded female member (as shown in FIG. 6). The engaging portion 136 may also comprise any configuration adapted to cooperate with a member to which it will be affixed. Additionally, the coupling or end fitting 130 can include a locking collar 138. The locking collar 138 can be disposed about the exterior of the hose assembly 100. In this manner, the inner liner 110 can be forced into tight frictional engagement with the insert portion 132 by molding or crimping the collar 138 to prevent relevant axial and rotational movement between the inner liner 110 and the insert portion 132. Alternatively, the coupling or end fitting 130 may be of an organic polymeric material and may be molded about the hose assembly forming either a mechanical and/or a chemical bond therebetween.

Methods for fabricating the tubular structure 10 and hose assembly 100, for the most part, utilize extrusion technology which is well-known in the art. For example, utilizing an extruder having a screw disposed in a barrel, a mandrel, and a die to form the tubular structure 10 or tubular inner liner 110.

Preferably, instead of premixing a chemical blowing agent with the fluoropolymer material prior to extrusion, a physical blowing agent or gas foaming agent such as air, nitrogen or Freon, with or without nucleating agents such as boron nitride and silicon dioxide, can be injected into the barrel of the extruder to cause the formation of foamed or expanded fluoropolymer material therein. Within the barrel of the extruder, the extrudate (the molten fluoropolymer material and gas) are under pressure created by the compression of the material by the screw. When the extrudate exits the barrel and die, the extrudate then comes into contact with the lower atmospheric pressure causing the extrudate to expand instantly. Thus, it is possible to expand or foam the fluoropolymer material without formulating the melt extrudable fluoropolymer material with a chemical blowing agent prior to extrusion. Such a product suitable for use in the present invention is TEFLON FEP CX5010N, an FEP fluoropolymer resin, sold by DuPont Company, Wilmington, Del., which consists of virgin TEFLON FEP 100 and boron nitride.

An alternative method of making the tubular structure 10 or the tubular inner liner 110 of the hose assembly 100, includes mixing raw melt extrudable fluoropolymer with a chemical foaming agent. An example of this is TEFZEL 220 CF sold by DuPont Company, Wilmington, Del., which is fluoropolymer resin consisting of TEFZEL 220, a chemical blowing agent that generates a resin-foaming gas, and a foam cell nucleant.

The melt extrudable fluoropolymer with or without the chemical blowing agent is advanced or carried through the barrel by the screw. The flight (or pitch) of the screw is selected to control the location within the barrel wherein the actual melting of the melt extrudable fluoropolymer occurs. It should be noted that, due to the temperature and corrosive nature of the liquid fluoropolymer material, that the extruder barrel and screw must be constructed of a high grade corrosion resistant material, such as Hastelloy C-276 (Haynes International), XALOY (306, 309), REILOY 115, BRUX (600, 900).

Additionally, depending on the melting temperature of the specific fluoroplastic used, both the extruder screw and/or the barrel can require the application of external heat from external heating sources to achieve and maintain the proper temperature necessary for extrusion of the melt extrudable fluoropolymer material. In general, melt extrudable fluoropolymer materials have a melting range between 400–1,000° F. However, in a preferred embodiment of the present invention, the melting temperature of the melt extrudable fluoropolymer material ranges from approximately 400–700° F. For example, the preferred range for FEP would be approximately 580–700° F., for PFA 680–740° F., and for ETFE 550–660° F. The external heating source can include, but is not limited to, heating bands placed around the barrel to create and maintain the specific, desired internal temperature.

The molten or flowable extrudable fluoropolymer which can include a blowing agent, is then extruded through the die and over the mandrel as is well known in the extrusion arts. Within the barrel of the extruder, the extrudate (the molten fluoropolymer material and gas) are under pressure created by the compression of the material by the screw. When the extrudate exits the barrel and die, the extrudate then comes into contact with the lower atmospheric pressure causing the extrudate to expand instantly. Chemical blowing agents at melt temperatures decompose and form gases such as carbon dioxide which mix with the polymer under pressure. The extrudate then foams upon exiting the die due to differential pressure between the internal extruder pressure and the lower atmospheric pressure.

Additionally, the foamed structure 110 can be formed by utilizing both a chemical blowing agent formulated with the melt extrudable fluoropolymer material prior to extrusion and by injecting a physical forming agent such as an inert gas into the barrel of the extruder as described above.

The control of void size and void content is critical as these parameters affect both the flexibility and permeability of the product. For example, an extruded tubular structure having a high content of small voids will yield a more flexible tubular structure. A tubular structure having a low content of large voids will yield a more rigid foamed tubular structure. In general, the void content of the tubular structure 10,110 can range from approximately 5–85%. Preferably, the void content ranges from approximately 20% to 50%. Also, in the preferred embodiment of the present invention, the voids or cells are closed. Closed cells or voids are preferred over open voids or cells as open cells can allow the migration and/or collection of fluids within the wall 16,216 of the tubular structure 10,110.

The amount of closed cells versus open cells in the extrudate can be varied by controlling factors such as the die temperature, melt temperature of the polymer, and the amount of blowing agent used.

During the extrusion of the expanded tubular structure 10,110, a skin 20,120, can be formed on either the outer surface 12,112, inner surface 14,114, or both surfaces of the extruded tubular structure 10,110. As described above, the skin 20,120 is a thin layer which can be varied in thickness. The skin creates a substantially smooth surface which defines the margins of the inner and/or outer diameters of the tubular structure 10,110.

The skin can be formed by several methods. A preferred method of forming the skin on either the outer surface 12,112, the inner surface 14,114, or both includes cooling or chilling either the mandrel, the die, or both to cause the formation the skin 20,120. By cooling or chilling the mandrel, the inner diameter of the tubular structure 10,110 or the inner surface 14,114 of the tubular structure 10,110, a skin can be formed. Likewise, by coding or chilling the die, the outer diameter of the tubular structure 10,110, or outer surface 12,112, the skin 20,120 can be formed. It is generally thought that chilling or cooling either the mandrel, the die, or both, causes the closed voids or cells contacting thereon to break, thus forming the skin 20,120. The temperature necessary to cause the formations of the skin 20,120 range from 500 to 700° F. depending on the polymer used. In general, a temperature decrease needed to form a skin in approximately 10–25% cooler than the melt temperature of the polymer. Also, a cooling bath or vacuum chamber may be necessary in order to retain the small cell structure which has been generated and to prevent blow holes on the surfaces of the foamed article.

Additionally, the skin 20,120 can be formed by coating either the mandrel, die, or both with a substance such as a defoaming agent like a polysiloxane co-polymer which, when the foamed or expanded fluoropolymer material comes into contact, causes the closed cells or voids to burst thereby yielding the skin 20,120.

After the extrudate has exited the die and mandrel, the extrudate immediately enters a chamber in which a vacuum is applied to the outer surface 12,112 of the tubular structure 10,110 to prevent the tubular structure 10,110 from collapsing. Within this vacuum chamber, a uniform negative pressure is applied about the outer surface 12,112 of the tubular structure 10,110. The amount of negative pressure ranges from approximately 10 inches of water to approximately 200 inches of water. The uniform application of the negative pressure about the outer surface 12,112 of the tubular structure 10,110 yields a tubular structure 10,110 having a substantially uniform eccentricity and concentricity.

Additionally, the formation of the skin 20,120 and the eccentricity and concentricity of the tubular structure 10,110 can be altered by varying the length of the die and/or the mandrel.

The vacuum chamber can include a cooling or quenching fluid, such as water, which causes the substantially molten expanded fluoropolymer material comprising expanded tubular structure 10,110 to solidify. This solidifying step can also occur outside of the vacuum chamber. That is, the extrudate can pass through the vacuum chamber and into a separate zone or container wherein it contacts the cooling fluid where the molten fluoropolymer material is solidified.

At this point, the formation of the expanded tubular structure 10,110 is substantially complete. As described above, a hose assembly 100 can be constructed by disposing at least one outer liner 121 about the tubular inner liner 110. The outer liner 121, as described above, can be disposed about the tubular inner liner 110 either by extrusion, braiding, or other techniques known to those skilled in the art. The methods for applying the outer liner 121 about the tubular inner liner 110 are described in detail above.

EXAMPLE

Because of the excellent insulatitive properties of the expanded tubular structure 10,110 due to entrapment of gas within the closed cells, the expanded tubular structure 10,110 can be utilized as an excellent low cost heat sleeve to protect temperature sensitive structures disposed therein from extreme temperatures.

The temperature difference ($\Delta t$) for various current heat sleeve devices was compared against the foamed fluoropolymer tube described above.

Samples of TEFLON® lined heat sleeve, nylon lined heat sleeve (FE4200, DuPont, Wilmington, Del.) foamed perfluorinated ethylene-propropylene (FEP), tubeless braid-ribbed, and tubeless braid-not ribbed were compared.

Procedure

Conduit temperature: each sample was routed 5 mm away from and along side a radiant heat source. A computer was used to collect temperature data for the heat source. Thermocouples were used to measure the outside temperature of each sleeve, the inside temperature of each sleeve, and the ambient temperature. Readings were taken every six seconds for thirty minutes after the desired temperature was reached. The heat source was set to obtain an inside sleeve temperature of 177° C. The results are shown in the accompanying Tables 1–4. The data obtained during this experiment illustrated that the foamed FEP heat sleeve alone gave $\Delta T$'s which were comparable or better than most of the other multilayered heat sleeves tested. This data illustrated that the foamed tubular structure of the present invention can be utilized as an excellent heat sleeve.

Throughout this application, various publication are referenced by citation and number. Full citations for the publication are listed below. the disclosure of these publications in their entireties are hereby incorporated by reference into this application in order to more fully describe the state of the art to which this invention pertains.

The invention has been described in an illustrative manner, and it is to be understood the terminology used is intended to be in the nature of the description rather than of limitation.

Obviously, many modifications and variations of the present invention are possible in light of the above teachings. Therefore, it is to be understood that within the scope of the appended claims, reference numerals are numerals are merely for convenience and are not to be in any way limiting, the invention may be practiced otherwise than as specifically described.

TABLES

DATA: DEGREES IN CENTIGRADES

| | SAMPLE # ONE | | | | SAMPLE # TWO | | | |
|---|---|---|---|---|---|---|---|---|
| | NYLON | | | | NYLON | | | |
| RUN | Source | outside sleeve | inside sleeve | DELTA T | Source | outside sleeve | inside sleeve | DELTA T |
| 1 | 451.0 | 243.0 | 177.0 | 66 | 447.0 | 219.0 | 177.0 | 42 |
| 2 | 458.0 | 249.0 | 174.0 | 75 | 429.0 | 223.0 | 176.0 | 47 |
| 3 | 457.0 | 250.0 | 177.0 | 73 | 429.0 | 223.0 | 177.0 | 43 |
| 4 | 459.0 | 250.0 | 177.0 | 73 | 439.0 | 220.0 | 173.0 | 47 |
| 5 | 459.0 | 259.0 | 177.0 | 82 | 431.0 | 231.0 | 177.0 | 54 |
| | TEFLON | | | | TEFLON | | | |
| RUN | Source | outside sleeve | inside sleeve | DELTA T | Source | outside sleeve | inside sleeve | DELTA T |
| 1 | 423.0 | 249.0 | 177.0 | 72 | 421.0 | 248.0 | 177.0 | 71 |
| 2 | 420.0 | 248.0 | 177.0 | 71 | 424.0 | 258.0 | 177.0 | 81 |
| 3 | 420.0 | 249.0 | 177.0 | 72 | 422.0 | 259.0 | 177.0 | 82 |

TABLES-continued

| | DATA: | | | DEGREES IN CENTIGRADES | | | | |
|---|---|---|---|---|---|---|---|---|
| | SAMPLE # ONE | | | | SAMPLE # TWO | | | |
| 4 | 424.0 | 249.0 | 177.0 | 72 | 425.0 | 262.0 | 177.0 | 85 |
| 5 | 421.0 | 249.0 | 177.0 | 72 | 425.0 | 265.0 | 177.0 | 88 |

| | FOAMED FEP. | | | | FOAMED FEP. | | | |
|---|---|---|---|---|---|---|---|---|
| RUN | Source | outside sleeve | inside sleeve | DELTA T | Source | outside sleeve | inside sleeve | DELTA T |
| 1 | 447.0 | 196.0 | 176.0 | 19 | 475.0 | 249.0 | 177.0 | 72 |
| 2 | 447.0 | 215.0 | 177.0 | 38 | 484.0 | 250.0 | 177.0 | 73 |
| 3 | 445.0 | 212.0 | 177.0 | 35 | 480.0 | 249.0 | 177.0 | 72 |
| 4 | 448.0 | 214.0 | 177.0 | 37 | 482.0 | 249.0 | 177.0 | 72 |
| 5 | 449.0 | 210.0 | 177.0 | 33 | 482.0 | 249.0 | 178.0 | 70 |

| | TUBLESS BRAID | | NOT RIBBED | | TUBLESS BRAID | | RIBBED | |
|---|---|---|---|---|---|---|---|---|
| RUN | Source | outside sleeve | inside sleeve | DELTA T | Source | outside sleeve | inside sleeve | DELTA T |
| 1 | 432.0 | 225.0 | 176.0 | 49 | 451.0 | 273.0 | 176.0 | 97 |
| 2 | 432.0 | 226.0 | 177.0 | 49 | 452.0 | 274.0 | 177.0 | 97 |
| 3 | 429.0 | 210.0 | 177.0 | 33 | 454.0 | 277.0 | 176.0 | 101 |
| 4 | 437.0 | 222.0 | 162.0 | 60 | 454.0 | 282.0 | 177.0 | 105 |
| 5 | 453.0 | 267.0 | 170.0 | 97 | 455.0 | 278.0 | 177.0 | 101 |

What is claimed is:

1. A tubular structure (10) comprising an expanded fluoropolymer material having an outer surface (12), an inner surface (14), and a wall (16) therebetween defining a channel (18); wherein said fluoropolymer material includes a melt extrudable fluorocarbon polymeric material; and wherein said melt extrudable fluorocarbon polymeric material includes perfluorinated ethylene-propropylene, or perfluoralkoxy fluorocarbon resin, or a polymer of ethylenetetrafluoroethylene.

2. A tubular structure (10) according to claim 1, wherein said expanded fluoropolymer material is comprised of a plurality of closed cells.

3. A tubular structure (10) according to claim 2, wherein said plurality of closed cells comprise between approximately 5%–85% percent of said tubular structure (10).

4. A tubular structure (10) according to claim 3, wherein said plurality of closed cells comprise between approximately 20%–50% percent of said tubular structure (10).

5. A tubular structure (10) according to claim 1, wherein said outer surface (12), said inner surface (14) or both include a skin (20).

6. A tubular structure (10) according to claim 5, wherein said skin (20) is substantially free of closed cells.

7. A tubular structure (10) according to claim 1, wherein said tubular structure (10) has a substantially circular cross-section.

8. A hose assembly (100) comprising: a tubular inner liner (110) formed of an expanded fluoropolymer material having an outer surface (112), an inner surface (114), and wall (116) therebetween defining a channel (118), and at least one outer liner (121) disposed about said outer surface (112); wherein said fluoropolymer material includes a melt extrudable fluorocarbon polymeric material; and wherein said melt extrudable fluorocarbon polymeric material includes perfluorinated ethylene-propropylene, or perfluoralkoxy fluorocarbon resin, or a polymer of ethylenetetrafluoroethylene.

9. A hose assembly (100) as set forth in claim 8, wherein said outer liner (121) includes a reinforcing layer (122) having gaps extending therethrough.

10. A hose assembly (100) as set forth in claim 9, wherein said reinforcing layer (122) has an inner and an outer periphery, said inner liner (110) extending from said inner periphery of said reinforcing layer (122) radially outwardly toward said outer periphery of said reinforcing layer (122).

11. A hose assembly (100) as set forth in claim 9, wherein said reinforcing layer (122) includes a tightly wound non-metallic material (124).

12. A hose assembly (100) as set forth in claim 11, wherein said non-metallic material (124) includes braided glass fiber.

13. A hose assembly (100) as set forth in claim 9, wherein said reinforcing layer (122) includes a braided metallic material (126).

14. A hose assembly (100) as set forth in claim 13, wherein said metallic material (126) includes stainless steel.

15. A hose assembly (100) as set forth in claim 8, wherein said outer liner (121) includes a polymeric material.

16. A hose assembly (100) as set forth in claim 15, wherein said polymeric material is a thermoplastic.

17. A hose assembly (100) as set forth in claim 16, wherein said thermoplastic includes polyamides, fluoropolymers, polyvinyls, polyesters, polyurethanes, PPS, and aliphatic polyketones.

18. A hose assembly (100) as set forth in claim 17, wherein said thermoplastic includes reinforcing materials disposed therein.

19. A hose assembly (100) as set forth in claim 17, wherein said polyamides include polyamide 6; polyamide 6,6; polyamide 11; polyamide 12, or mixtures thereof.

20. A hose assembly (100) as set forth in claim 16, wherein said thermoplastic is expanded.

21. A hose assembly (100) as set forth in claim 8, wherein said inner liner (110) includes an integral conductive means (128) coextensive with the length of said inner liner (110) for conducting electrical charges along the length of said inner liner (110).

22. A hose assembly (110) as set forth in claim 21, wherein said integral conductive means (128) includes carbon black.

23. A hose assembly (100) as set forth in claim 8, further including coupling means (130) for interconnecting the ends of said hose assembly (100) to a flow of fluid.

* * * * *